United States Patent
Lofftus et al.

(10) Patent No.: US 9,891,350 B2
(45) Date of Patent: *Feb. 13, 2018

(54) LIGHT BLOCKING ARTICLES HAVING OPACIFYING LAYERS

(71) Applicant: Eastman Kodak Company, Rochester, NY (US)

(72) Inventors: Kevin D. Lofftus, Fairport, NY (US); Mridula Nair, Penfield, NY (US); Mary Christine Brick, Webster, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 75 days.

This patent is subject to a terminal disclaimer.

(21) Appl. No.: 14/181,766

(22) Filed: Feb. 17, 2014

(65) Prior Publication Data

US 2015/0234098 A1    Aug. 20, 2015

(51) Int. Cl.
 *C08J 9/00*      (2006.01)
 *C08J 9/236*     (2006.01)
 *G02B 5/00*      (2006.01)

(52) U.S. Cl.
 CPC ............ *G02B 5/003* (2013.01); *C08J 9/0004* (2013.01); *C08J 9/236* (2013.01); *C08J 2301/10* (2013.01); *Y10T 428/249972* (2015.04)

(58) Field of Classification Search
 CPC ......... G02B 5/003; C08J 9/0004; C08J 9/236; C08J 2301/10
 USPC ............................... 428/220, 313.5; 252/582
 See application file for complete search history.

(56) References Cited

U.S. PATENT DOCUMENTS

| | | |
|---|---|---|
| 3,296,023 A | 1/1967 | Leaderman et al. |
| 3,527,654 A | 9/1970 | Jones et al. |
| 3,607,341 A | 9/1971 | Goins et al. |
| 3,615,970 A | 10/1971 | May |
| 3,748,217 A | 7/1973 | May et al. |
| 3,862,291 A | 1/1975 | Brandon, Jr. et al. |
| 4,056,646 A | 11/1977 | Westfall et al. |
| 4,362,774 A | 12/1982 | Brandon, Jr. et al. |
| 4,397,346 A | 8/1983 | Chumbley et al. |
| 4,409,275 A | 10/1983 | Samowich |
| 4,457,980 A | 7/1984 | Daniels et al. |
| 4,608,298 A | 8/1986 | Klaff |
| 4,677,016 A | 6/1987 | Ferziger et al. |
| 4,830,897 A | 5/1989 | Lichtenstein |
| 5,019,445 A | 5/1991 | Sternlieb |
| 5,132,163 A | 7/1992 | Leaderman et al. |
| 5,360,668 A | 11/1994 | Sternlieb |
| 5,565,265 A | 10/1996 | Rubin et al. |
| 5,576,054 A | 11/1996 | Brown |
| 5,741,582 A | 4/1998 | Leaderman et al. |
| 6,439,269 B1 | 8/2002 | Weil et al. |
| 7,572,846 B2 | 8/2009 | Engelbrecht et al. |
| 7,754,409 B2 | 7/2010 | Nair et al. |
| 7,887,984 B2 | 2/2011 | Nair et al. |
| 8,252,414 B2 | 8/2012 | Putnam et al. |
| 8,329,783 B2 | 12/2012 | Nair et al. |
| 8,435,340 B2 | 5/2013 | Wheeler et al. |
| 2002/0025430 A1* | 2/2002 | Weissgerber ........... B32B 27/30  428/343 |
| 2002/0122949 A1 | 9/2002 | Richards |
| 2003/0186157 A1* | 10/2003 | Teraoka ................. G03G 9/125  430/114 |
| 2004/0234709 A1* | 11/2004 | Ishida et al. ............... 428/32.34 |
| 2012/0017807 A1* | 1/2012 | Reddy .................... C01G 39/00  106/479 |
| 2012/0167666 A1 | 7/2012 | Nair et al. |
| 2013/0029102 A1 | 1/2013 | Landry-Coltrain et al. |
| 2013/0029103 A1 | 1/2013 | Landry-Coltrain et al. |
| 2013/0029128 A1 | 1/2013 | Nair et al. |
| 2013/0029155 A1 | 1/2013 | Nair |
| 2013/0030070 A1* | 1/2013 | Nair .......................... C08J 9/28  521/149 |
| 2013/0183500 A1* | 7/2013 | Kasperchik et al. ......... 428/207 |

FOREIGN PATENT DOCUMENTS

| | | | |
|---|---|---|---|
| EP | 0 105 598 A2 | 4/1984 | |
| EP | 1158029 A1 * | 11/2001 | ............. C09D 11/30 |
| WO | WO 02/092681 A1 | 11/2002 | |
| WO | WO 03/093372 A1 | 11/2003 | |
| WO | WO 2012006047 A1 * | 1/2012 | ............ C09D 11/326 |

OTHER PUBLICATIONS

Reusch, William. Visible and Ultraviolet Spectroscopy. Michigan State University. Published Online May 5, 2013. Accessed Aug. 4, 2015. pp. 1-6.*

* cited by examiner

*Primary Examiner* — Maria Veronica Ewald
*Assistant Examiner* — Ethan Weydemeyer
(74) *Attorney, Agent, or Firm* — J. Lanny Tucker

(57) ABSTRACT

A light-blocking article is designed to be lightweight but effective to block most incident actinic radiation and can be designed into fabrics, curtains, and other materials. Such an article has an opacifying layer that is capable of blocking predetermined electromagnetic radiation. The article contains (a) porous particles comprising a continuous polymeric binder and pores within the continuous polymeric binder, the porous particles having a glass transition temperature of at least 25° C. and a mode particle size of at least 2 μm and up to and including 50 μm. The article also contains an opacifying colorant that absorbs the predetermined electromagnetic radiation (such as within 400 nm to 700 nm), in an amount of at least 0.001 weight % based on the total dry weight of the opacifying layer, and a matrix polymer in which the porous particles and opacifying colorant are dispersed.

11 Claims, No Drawings

LIGHT BLOCKING ARTICLES HAVING OPACIFYING LAYERS

FIELD OF THE INVENTION

This invention relates to articles that are impermeable to electromagnetic radiation such as UV, IR, and visible light. These opacifying articles are designed to block incident light (including sunlight) for various purposes. For example, the opacifying articles of this invention can be designed as curtains, shades, clothing, armor, or other fabric-based light shielding materials.

BACKGROUND OF THE INVENTION

In general when light strikes a surface, some of it may be reflected, some absorbed, some scattered, and the rest transmitted. Reflection can be diffuse, such as light reflecting off a white wall, or specular, as in light reflecting off a mirror. An opaque substance transmits almost no light, and therefore reflects, scatters, or absorbs all of it. Both mirrors and carbon black are opaque. Opacity depends on the frequency of the light being considered. "Blackout" or light blocking materials typically refer to coated layers in articles that are substantially impermeable to light such as visible or UV radiation. Thus, when a blackout material such as a blackout curtain is hung over a window, it generally blocks substantially all external light from entering the room through that window. Blackout materials are suitable as curtains for domestic use, for institutional use in hospitals and nursing homes, as well as for use in commercial establishments such as hotels, movie theaters, and aircraft windows where the option of excluding light from a room can be desirable.

The human eye has about 12 or 13 orders of magnitude dynamic range in detecting light intensity and it can easily detect conditions ranging from noon sun on new snow at high elevations with no clouds or haze, to moonless night with some haze. Normal sunlight is about 8 orders of magnitude brighter than starlight but only about 3 orders brighter than a typical living room and 2 orders brighter than a typical office. Thus for example, it is desirable for a blackout material to reduce transmitted sunlight into a living room by at least 3 orders of magnitude for lighted observation such as looking at screens of televisions, computers, or mobile telephones or other devices and by at least 5 orders of magnitude for activities requiring further darkening such as sleeping. The presence of external sunlight reflectors such as snow or sand requires an even greater extent of light blocking.

The measure of the extent to which a substance transmits light or other electromagnetic radiation is given by the transmission density ($D_t$), also known as optical density, and is equal to the logarithm to base ten of the reciprocal of the transmittance. The transmission of electromagnetic radiation through an absorbing medium in a coated layer, with an absorption coefficient that characterizes how readily a material or medium can be penetrated by a beam of light, follows Beer's law (the linear relationship between log of the absorbance and concentration of an absorber of electromagnetic radiation). The coating exhibits an exponential decay in the intensity of transmitted light with increased thickness of the coated layer. The characteristic penetration depth of electromagnetic radiation into the coated layer (the reciprocal of the absorption coefficient) is a measure of how deep the electromagnetic radiation can penetrate the coated layer before it is stopped, and is defined as the depth at which the intensity of the radiation inside the coated layer falls to 1/e (about 37%) of its original value just below its surface. Depending on the nature of the coated layer, the electromagnetic radiation might travel very far into the coated layer or it might be blocked quickly. When the electromagnetic radiation passes through media that have both scattering and absorbing properties, the radiation can be further weakened or attenuated.

Light blocking articles such as the blackout curtains can be comprised of a fabric coated with polymeric latex foams. There is a desire for these curtains to have a light color (hue) facing the environment when an activity needs illumination so as to minimize the amount of artificial lighting needed to perform the activity. Additionally, having a light colored back side is desirable. An example is when the function of the blackout material is to separate two areas of activity where one or both areas can be artificially lit at the same time. More often, the function of a blackout curtain is to prevent sunlight from entering a room through a building window. It can also be desirable for the color (hue) of the back side to match the external decor of the building.

Light colored blackout curtains can be made by coating a fabric with light colored foams containing light scattering pigments such as titanium dioxide or clays. Because light is scattered more forward than backward from any light scattering pigment, very thick foam coatings are required to create blackout curtains through which the sun is not visible in a darkened room. These light scattering pigments are heavy in weight and require a special fabric to cover a window. One method that is used to reduce the weight of such blackout materials is to sandwich a light-absorbing carbon black layer between two light scattering layers.

In other applications of such materials, an opacifying layer can be used to hide an undesirable colored material beneath it. In these instances, where reflected light is observed after it enters an opacifying layer, the light travels though the opacifying layer twice as it is reflected back from a substrate. This effect reduces the required light blocking optical density by 50% of what is required for the situation when transmitted radiation is observed in blackout materials.

Vesiculated polymer particles have been used as replacements for light scattering pigments such as titanium dioxide. The large difference in refractive indexes between the entrapped air and the polymer walls of the particles causes light scattering and contributes to the hiding power and white appearance of the resulting opacifying coating. With this optical phenomenon, opacity and whiteness arises from the interaction of light with a multiplicity of interfaces and microvoids. U.S. Pat. No. 7,572,846 (Engelbrecht et al.) describes a method for the manufacture of vesiculated polymer particles that are suitable for the replacement of titanium dioxide pigments and extenders, and that are said to have opacity, whiteness, scrub resistance, and water resistance.

U.S. Pat. No. 4,677,016 (Ferziger et al.) describes a flame retardant, drapeable, and substantially light impermeable fabric that is considered suitable for use as a curtain, window shade, or other window covering and comprises foam coating compositions in which one of the foam coated layers is opaque and is comprised of a cured layer of a polymer latex foam.

U.S. Pat. No. 4,457,980 (Daniels et al.) discloses highly opaque printed areas on uncolored or pre-colored fabrics with the use of an aqueous opaque printing paste comprising a dispersion of an opacifying pigment and an aqueous curable latex polymer binder.

U.S. Pat. No. 5,576,054 (Brown) describes silicone rubber compositions and a method of opacifying a spandrel glass surface, to stop light transmission by applying to the surface a coating composition comprising an ultraviolet light resistant organopolysiloxane and an opacifying agent that is a mixture of carbon black and titanium dioxide present in the amount of 1 to 25% by weight and in a ratio of between 1:10 and 1:100 by weight of carbon black to titanium dioxide, in an amount sufficient to provide sufficient surface opacity to light transmission, and curing the coating composition on the surface.

U.S. Pat. No. 8,435,340 (Wheeler et al.) describes an aqueous coating composition having a pigment volume content (PVC) of 78% to 88% comprising, based on the total volume solids of the dry coating, opacifying pigment particles comprising: from 3 to 10% titanium dioxide, from 0 to 20% of hollow polymeric particles; non-opacifying extender particles, polymer binder particles of calculated Tg of from 25° C. to 70° C., a dispersant, and a fugitive coalescing solvent.

U.S. Pat. No. 7,754,409 (Nair et al.), U.S. Pat. No. 7,887,984 (Nair et al.), U.S. Pat. No. 8,252,414 (Putnam et al.), and U.S. Pat. No. 8,329,783 (Nair et al.) describe porous polymer particles that are made by a multiple emulsion process, wherein one phase of the process provides formation of individual porous particles comprising a continuous polymer phase and internal pores, and such individual porous particles are dispersed in an external aqueous phase. The described Limited Coalescence process is used to control the particle size and distribution while a hydrocolloid is incorporated to stabilize the inner emulsion that provides the pores in the porous particles.

When an electromagnetic radiation blocking coating has, as it often does, a strongly light absorbing material such as carbon black between two reflective layers, it has at least two distinct problems. First, such materials require three separate coating operations that reduce manufacturing productivity and increase unit costs. Secondly, the light absorbing layer can be exposed to the environment by stitching failure or surface damage of the white reflective coatings and the damaged area will be highly visible against the lightly colored reflective surface. Additionally, the stitching in the materials can generate fugitive material from the light absorbing layer that can be spread over a larger area thereby increasing the area of objectionable shading of the light colored surface. Inorganic pigments typically used for high opacity coatings are high specific gravity pigments that can undesirably settle in the coating solvents. Thus, they are difficult to keep dispersed in the coating formulations and contribute a significant amount of weight to the final coating.

There is therefore a need to replace high specific gravity inorganic pigments such as titanium dioxide, additional extenders, and other high weight additives to provide a radiation-blocking material that is suitable as a blackout material but also light-weight and possesses the supple feel that is characteristic of textiles. There is also a need for radiation-blocking materials that can be readily washed and sewn without carbon black showing through or being exposed to the environment. There is a further need to keep the article thickness and the number of manufacturing operations (for example, coating passes) to a minimum. It is also desirable to have a light colored article with an outer coating that is easily tinted or shaded with additional colorants to meet the user and environmental needs. For example, it is also desirable to provide a means for the color of the radiation-blocking article to match that of external decor.

SUMMARY OF THE INVENTION

The present invention provides novel and advantageous articles to address the noted problems.

Thus, the present invention provides an article comprising an opacifying layer that is capable of blocking predetermined electromagnetic radiation, the article comprising:

(a) porous particles comprising a continuous polymeric binder and pores within the continuous polymeric binder, the porous particles having a glass transition temperature of at least 25° C. and a mode particle size of at least 2 µm and up to and including 50 µm, (b) an opacifying colorant that absorbs the predetermined electromagnetic radiation, the opacifying colorant being present in an amount of at least 0.001 weight % based on the total dry weight of the opacifying layer, and (c) a matrix polymer in which the porous particles and opacifying colorant are dispersed.

As described in more detail below, any embodiment of the article of this invention can further comprise a tinting colorant other than the opacifying colorant in the opacifying layer in an amount of at least 0.001 weight % based on the total dry weight of the opacifying layer.

The articles of this invention provide several important advantages. For example, the articles of the present invention provide a means for avoiding the use of high specific gravity inorganic pigments in large amounts that is typical of opacifying articles of the prior art, as the inventive articles are lightweight and have high opacity while retaining high reflectance and light coloration.

In addition, the specific gravity of the porous particles used in the practice of this invention is approximately the same as the specific gravity of the coating fluid(s). Therefore, little segregation between particles and fluid occurs before drying, unlike segregation observed in fluids containing high specific gravity pigments used in the art.

While the small amount of opacifying colorant that enhances the electromagnetic radiation blocking properties of the opacifying layer in the article can be anywhere in the opacifying layer, it is desirably contained in the porous particles, either in the pores or in the continuous polymeric binder, or in both pores and continuous polymeric binder. In the absence of this opacifying colorant, the article would have to be much thicker to provide equivalent light blocking properties. Furthermore, the fact that only a very small amount of opacifying colorant is needed for the advantages prevents dark coloration of the articles.

The opacifying colorant used in the articles of the present invention can be provided within fabrics in a manner so that the opacifying colorant is prevented from showing through during sewing, or if the fabrics are cut or accidentally torn. Thus, the present invention provides a means for incorporating only extremely small amounts of carbon black as the opacifying colorant within the opacifying layer without having a layer of carbon black isolated between outer layers of foam as is practiced in the prior art. As a result, the carbon black cannot readily soil the articles of this invention, when they are cut, torn, or sewn.

An aqueous coating formulation can be used in the practice of this invention to prepare the opacifying layer and such formulation is generally comprised of, for example, a stable aqueous dispersion of porous particles containing the opacifying colorant and the matrix polymer that serves to bind together the components of the opacifying layer and to affix them to an underlying layer or substrate upon drying. In some embodiments, the matrix polymer can be chemically crosslinked. The coating formulations can optionally include relatively smaller amounts of other materials, such as crosslinking agents, tinting colorants, thickeners, emulsifiers, and pH control agents. The absence of high specific gravity inorganic pigments keeps the porous particles in the opacifying layer formulations from settling, thus providing consistent reproducible coatings on a wide variety of substrates and the resulting articles do not have undesirable weight. The noted aqueous coating formulations can be coated or applied to a substrate such as for example, a fabric in an amount sufficient to form, in a dried and optionally crosslinked state, an opacifying layer with excellent durability, water fastness, flexibility, and desired tactile properties, with rendering the resulting articles as flexible and washable.

Moreover, the electromagnetic radiation-blocking articles of the present invention not only have high electromagnetic radiation blocking ability but they also exhibit high reflectance and can be designed with light coloration to provide aesthetic properties for intended uses. Interstitial voids between the porous particles in the opacifying layer described herein improve light blocking. Greater interstitial void volume near the surface results in a more diffuse surface and decreases the internal reflections of back scattered light. As a result, a lighter colored surface will be observed in such embodiments. Light scattering at high volume fraction of scattering centers is controlled by the pores in the porous particles used in this invention thereby eliminating the need for added extenders to prevent the particle crowding phenomenon typical of high specific gravity inorganic pigments such as titanium dioxide at high particle loadings.

The high reflectance of the resulting opacifying layers and articles of the present invention enables a wide range of tinting (or coloration) possibilities to be achieved with the addition of one or more tinting colorants to the opacifying layer. One or more tinting colorants (as described below) can optionally be added to the porous particles (either in the pores or in the continuous polymeric binder) or to the matrix polymer to modify the coloration or hue of the opacifying layer, but not necessarily to change its opacifying capacity.

It has also been discovered that the composition and construction of the outermost surfaces of the articles of this invention can be designed to be receptive to inks or other printing compositions so that various text or images can be applied to such outermost surfaces.

DETAILED DESCRIPTION OF THE INVENTION

Definitions

As used herein to define various components of the porous particles, opacifying layers, and underlying layers, unless otherwise indicated, the singular forms "a", "an", and "the" are intended to include one or more of the components (that is, including plurality referents).

Each term that is not explicitly defined in the present application is to be understood to have a meaning that is commonly accepted by those skilled in the art. If the construction of a term would render it meaningless or essentially meaningless in its context, the term definition should be taken from a standard dictionary.

The use of numerical values in the various ranges specified herein, unless otherwise expressly indicated otherwise, are considered to be approximations as though the minimum and maximum values within the stated ranges were both preceded by the word "about". In this manner, slight variations above and below the stated ranges can be used to achieve substantially the same results as the values within the ranges. In addition, the disclosure of these ranges is intended as a continuous range including every value between the minimum and maximum values, and unless otherwise indicated, the range end points as well.

Unless otherwise indicated, the terms "opacifying article" and "article" are intended to refer to the same element.

The terms "porous particle" and "porous particles" are used herein, unless otherwise indicated, to refer to polymeric materials useful in the opacifying layer compositions essential for the present invention. The porous particles generally comprise a solid continuous polymeric particle having an external particle surface and discrete compartments dispersed within the continuous solid phase.

Unless otherwise indicated, the term "non-porous" refers to particles that are not designed to have discrete compartments within the solid continuous polymeric phase and less than 5% of their total volume consists of pores.

The continuous polymeric binder of the porous particles is generally non-porous and has the same composition throughout that phase. That is, the continuous polymeric binder is generally uniform in composition including any additives (for example, colorants or additives) that can be incorporated therein. In addition, if mixtures of polymers are used in the continuous polymeric binder, generally those mixtures are dispersed uniformly throughout.

The term "porogen" refers to a pore forming agent used to make porous particles for use in the present invention. For example, in the practice of the present invention, a porogen can be the aqueous phase of water-in-oil emulsions (that is the first aqueous phase), the pore stabilizing hydrocolloid, or any other additive in the aqueous phase that can modulate the porosity of the porous particles.

The term "size" refers to the modal or average diameter referring to particles or to internal compartments (pores).

The porous particles can include "micro", "meso", and "macro" pores, which according to the International Union of Pure and Applied Chemistry, are the classifications recommended for pore sizes of less than 2 nm, from 2 nm to 50 nm, and greater than 50 nm, respectively. Thus, while the porous particles can include closed pores of all sizes and shapes (pores entirely within the solid continuous polymeric binder) providing a suitable volume in each compartment (pore), macro pores are the preferred closed compartments. While there can be open macro compartments on the surface of the porous particle, such open compartments (pores) are not desirable and can be present only by accident. The size of the particle, the formulation, and manufacturing conditions are the primary controlling factors for pore size. However, typically the pores independently have an average diameter size of at least 100 nm and up to and including 4 µm, or more likely at least 200 nm and up to and including 2 µm. For spherical pores, this average pore size is an "average diameter". For non-spherical pores, the average compartment size refers to the "average largest dimension". Average pore size can be determined by analyzing Scanning Electron Microscopy (SEM) images of fractured porous particles using a commercial statistical analysis software package to study the distribution of the compartments within the particles, or by manually measuring the pore diameters using the scale in the SEM images. For example, the average pore size can be determined by calculating the average diameter of at least 20 measured compartments in a single porous particle.

The porous particles used in this invention generally have porosity of at least 5% and up to and including 70%, or likely at least 10% and up to and including 50%, or more typically at least 10% and up to an including 40%, all based on the total porous particle volume. Porosity can be measured by the mercury intrusion technique.

The term "matrix polymer" is used herein to define polymers that are present in the coating formulation (and opacifying layer) that hold the porous particles within the dried layer and give it integrity and flexibility. Such materials are to be differentiated from the continuous polymeric binders used to prepare the porous particles described herein.

The term "void" is used to define a space between porous particles not filled with matrix polymer in the opacifying layer. Voids can be interconnected to form a network of voids or they can exist in isolation from other voids.

In evaluating the articles of the present invention, the term "transparency depth", analogous to "penetration depth", is defined as the natural logarithm of 10 divided by the attenuation coefficient and is the depth at which the intensity of the electromagnetic radiation falls to 10% of the original value.

"Opacity" is defined as the ability of an opacifying layer to prevent the transmission of electromagnetic radiation such as visible light. A greater opacity indicates a more efficient the blocking (hiding) of predetermined radiation. The "opacity" of an opacifying layer is quantified for this invention as the inverse of the transparency depth.

Numerous metrics such as the contrast ratio (reflectance of the opacifying layer on a black substrate contrasted to the opacifying layer reflectance on a white substrate) and Hunter opacity (the ratio of tri-stimulus values Y of the opacifying layer on a black substrate to that on a white substrate) have been developed to quantify opaque layers. While these metrics specifically quantify the ability of an opacifying layer to hide a substrate beneath, they cannot describe effectively the electromagnetic radiation (light) blocking properties in transmission. To do this, other tools such as the Kubelka-Munk (K-M) model are needed.

Lightness (L*) is a measure of the light reflectivity of an opacifying layer and refers herein to the lightness in the L*a*b* color space (also referred to as CIELAB) specified by the Commission Internationale de l'Eclairage, wherein a* and b* are the chromaticity coordinates. The L* value is measured at an observation angle of 2° and whose values run from the darkest value of 0 (black) to the lightest value 100 (white).

Reflectance is the fraction of incident electromagnetic radiation that is reflected at an interface, for example at the air-opacifying layer interface.

A reflectance of 0.6 (L*=82) is perceived a light gray and can be easily tinted or printed onto to produce most colors. A medium gray in color science is defined as having a reflectance of 0.18 with L*=50. A reflectance greater than 0.8 (L*=91) is perceived as white while a reflectance between 0.7 (L*=87) and 0.8 is perceived at off-white. "White" can further be characterized by the CIE whiteness index with 100 representing the best white coloration while values greater than 100 represent blue tints of the white coloration and values less than 100 represent yellow tints of white coloration. Useful L* values are >65, or >70, or even >80.

Uses

The articles of the present invention exhibit blackout properties and can optionally have an opaque printable surface able to accept large amounts of ink as in inkjet printing. Articles of this invention are useful as electromagnetic radiation blocking materials for blackout curtains, banners, and window shades for airplanes, labels, projection screens, textile fabrics, and packaging. The teaching provided herein would likely suggest other uses that are not explicitly mentioned.

Opacifying Layer Compositions

Typical white inorganic pigments such as titanium dioxide block electromagnetic radiation by light scattering as a result of refractive index differences between the inorganic pigment and the surroundings influenced by the pigment size. Additionally, there is only so much volume that can be filled (0.635 of random close packing of monodispersed spheres) before interstitial cavities form between packed particles.

The opacity of an opacifying layer is enhanced by interstitial voids that are formed when the particle volume concentration (PVC), typically pigment particles such as titanium dioxide, is above a critical level. The sizes of the interstitial voids for example between the titanium dioxide particles are smaller than the particles themselves and decrease with increasing polydispersity of the particles. Since the pigment particle sizes are optimized for maximum light scattering when dispersed in a polymeric matrix above the critical PVC, the interstitial voids created by the particles will be too small to also optimally scatter light. Crowding occurs when the spacing between pigment particles decreases to the point where the light scattering becomes dependant on the concentration of the pigment particles and the effectiveness of scattering by the pigment particles is reduced as the pigment is loading increased. This is known as "dependant scattering", a phenomenon where the effective scattering diameter, or scattering zones, of pigment particles become effectively greater than their actual diameter. These scattering zones overlap as the concentration of scattering pigment increases, reducing scattering efficiency, and resulting in the crowding effect. Small and large particle size extenders have been used in an attempt to create greater separation between the scattering pigment particles and reduce the overlap of the scattering zones to result in greater scattering efficiency and opacity.

For the porous particles used in the present invention, the spacing between the scattering pores within the porous particles is controlled during the process of forming them and is not subject to subsequent formulation effects such as dependant scattering effects.

An opacifying layer designed for the present invention comprises porous particles containing a small amount of an opacifying colorant to enhance the light blocking capacity of the porous particles (particularly transmitted light blocking capacity), a matrix polymer to hold the porous particles in place, and optionally one or more tinting colorants that can be in the porous particles or dispersed within the matrix polymer. The articles of this invention can also contain an underlying layer. In some embodiments, the opacifying layer can comprise interstitial voids not filled with matrix polymer among the porous particles.

The large mismatch in refractive index between the pores of the dried porous particles and the polymer walls (binder) of the porous particles in the opacifying layer causes incident electromagnetic radiation passing through the opacifying layer to be scattered by the multiplicity of interfaces and pores. The back scattered electromagnetic radiation can again be scattered and returned in the direction of the incident electromagnetic radiation thus reducing the attenuation and contributing to the opacifying power and whiteness of the opacifying layer. If a small amount of electromagnetic radiation absorbing opacifying colorant is present in the opacifying layer, for example in either in the pores or in the binder of the porous particles, the opacifying power of the opacifying layer is increased. This is because the multiple scattering of the electromagnetic radiation in the opacifying layer increases the path length of the electromagnetic radiation through the opacifying layer thereby increasing the chance that the electromagnetic radiation will encounter the opacifying colorant in the opacifying layer.

A single opacifying layer used in the present invention comprises porous particles and a relatively low amount of a predetermined electromagnetic radiation absorbing opacifying colorant such as carbon black for creating electromagnetic radiation blocking coatings. Multiple light scattering effects by and among the porous particles increases the path of the radiation through the opacifying layer. The likelihood of encountering an opacifying colorant is increased by this greater path length.

The Kubelka-Munk (K-M) method is a useful way to characterize materials containing both scattering and absorbing components such as the opacifying layers used in the present invention and this method can be used to predict the opacifying layer thickness that is needed for blocking predetermined electromagnetic radiation using measurements performed on thin coatings. This method uses two parameters: S the scattering coefficient and K the absorbance coefficient provided the limits of K-M method apply to thin coatings. The limitations are that the coating must have a transmittance (T) less than 0.37 and the measurement light source is uniformly diffuse. The K-M equation for transmittance through a layer of thickness X is as follows:

$$T = \frac{(1 - R_\infty^2)e^{-\sqrt{K(S+K)}\ X}}{1 - R_\infty^2 e^{-2\sqrt{K(S+K)}\ X}}$$

where $$R_\infty = \frac{K + S - \sqrt{K(2S + K)}}{S}$$

The term $R_\infty$ is the reflectance for a coating of an infinite thickness. The K-M attenuation coefficient $\alpha$, for optically thick coatings using this K-M equation, is the square root of the product of K-M absorption coefficient times the sum of the absorption and scattering coefficients:

$$\alpha = \sqrt{K(2S+K)}.$$

In order to predict the coating thickness required for desired electromagnetic radiation blocking properties, a linear K-M equation for transmittance is used. This is applicable for transmission densities $(D_t)$ greater than 1.5. For an opacifying layer thickness X using the transparency depth $X_{10}$ the equation becomes:

$$D_t = \frac{X}{X_{10}} - \frac{\ln(1 - R_\infty^2)}{\ln(10)}$$

where $$X_{10} = \frac{\ln(10)}{\sqrt{K(2S + K)}}$$

The transparency depth $X_{10}$ is the incremental increase in coating thickness required for a unit increase in transmission density $D_t$.

The reflectance R at infinite thickness layers is monotonically related to the lightness L*. Thus, only two parameters are needed to characterize the layer, for example $X_{10}$ and L*. Empirically, the relationship between reflectance and L* is:

$$L^* = 32.6 + 106.7R - 40.9R^2$$

for reflectance between 0.18 and 0.93. Furthermore, when no electromagnetic radiation absorbing colorant is present in the opacifying layer, a modification of the K-M method was carried out to obtain the transmittance and reflectance as shown below, where $R_g$ is the reflectance of the substrate on which the opacifying layer is disposed:

$$T = \frac{1}{1 + SX} \quad R = \frac{R_g + SX(1 - R_g)}{1 + SX(1 - R_g)}$$

The opacifying layers designed for use in the present invention can have a CIELAB L* value greater than 70 or typically greater than 77. For practical purposes, the CIELAB L* value is generally less than 100. These L* values can be determined using known CIELAB procedures.

It is particularly useful that the opacifying layer is designed with appropriate porous particles, opacifying colorants, and matrix polymer so that it (and any article into which it is incorporated) can block at least 70% (or even at least 85%) of predetermined electromagnetic radiation (described above) that is incident upon the opacifying layer, compared to a control layer (or control article containing same) from which the porous particles described herein have been omitted.

When formed as a layer, such as on a suitable substrate as described below, the opacifying layer is generally designed to have an average dry thickness of at least 50 μm, or more typically of at least 100 μm.

The size and amount of the porous particles and the amount of matrix polymer can be designed so that the opacifying layer has an interstitial void volume of at least 5 volume %, or typically at least 20 volume %, and usually less than 30 volume %, based on the total volume of the opacifying layer.

Porous Particles:

Porous particles containing discrete pores (or compartments) are used in the opacifying layers and they are generally prepared, as described below, using multiple water-in-oil emulsions in combination with an aqueous suspension process, such as in the ELC process. The details for the preparation of these porous particles are provided, for example, in the U.S. Patent Application Publication 2013/0030070 (Nair et al.) and U.S. Pat. No. 7,754,409 (Nair et al.), U.S. Pat. No. 7,887,984 (Nair et al.), and U.S. Pat. No. 8,252,414 (Putnam et al.), the disclosures of all of which are incorporated herein by reference.

Useful porous particles having effective electromagnetic radiation blocking ability and controlled particle size and particle size distribution can be made using a multiple emulsion process, in conjunction with a suspension process, particularly, the evaporative limited coalescence (ELC) process.

The porous particles are composed of a continuous polymeric binder derived from addition or condensation polymers or by polymerization of ethylenically unsaturated polymerizable monomers or oligomers. The materials are chosen so that the porous particles generally have a glass transition temperature $(T_g)$ of at least 25° C., or more typically of at least 25° C. and up to and including 180° C., as determined by Differential Scanning Calorimetry. However elastomeric particles with $T_g$ below 25° C. may also be used in the practice of this invention.

In addition, the porous particles used in the opacifying layer have a mode particle size equal to or less than 50 μM, or of at least 2 μm and up to and including 50 μm or typically of at least 3 μm and up to and including 40 μm. Most useful porous particles have a mode particle size of at least 3 μm and up to and including 20 μm. Mode particle size represents the most frequently occurring diameter for spherical particles and the most frequently occurring largest diameter for the non-spherical particles in a particle size distribution histogram.

Pore stabilizing materials such as hydrocolloids can be present within the discrete compartments or pores in the porous particles of this invention, which pore stabilizing materials are described in patents cited above. In some embodiments, the same pore stabilizing material is incorporated throughout the porous particles.

The porous particles used in this invention can be spherical or non-spherical depending upon the desired use. In a method used to prepare the porous particles, additives (shape control agents) can be incorporated into the first or second aqueous phases, in the oil (organic) phase to modify the shape, aspect ratio or morphology of the porous particles. The shape control agents can be added prior to or after forming the water-in-oil-in-water emulsion. In either case, the interface at the oil and second water phase is modified before solvent is removed, resulting in a reduction in sphericity of the porous particles. The porous particles used in the present invention can also comprise surface stabilizing agents, such as colloidal silica, on the outer surface of each porous particle, in an amount of at least 0.1 weight %, based on the total dry weight of the porous particle.

The plurality of discrete (or individually isolated) pores (or compartments) has an average pore size of at least 100 nm and up to and including 4,000 nm, or more typically at least 200 nm and up to and including 2,000 nm.

The porous particles used in this invention generally have porosity of at least 5% and up to and including 70%, or likely at least 10% and up to and including 50%, or more typically at least 10% and up to an including 40%, all based on the total porous particle volume.

The porous particles can be provided as powders, or as aqueous suspensions (including water or water with water-miscible organic solvents such as alcohols). Such aqueous suspensions can also include surfactants or suspending agents to keep the porous particles suspended. The other compositional features are described in the following description of methods for preparing the porous particles.

The details for preparing useful porous particles are provided in U.S. Patent Application Publications 2008/0176157 (noted above), 2010/0021838 (noted above), and 2013/0030070 (noted above) and U.S. Pat. No. 7,754,409 (Nair et al.), U.S. Pat. No. 8,110,628 (Nair et al.), U.S. Pat. No. 7,887,984 (Nair et al.), U.S. Pat. No. 8,252,414 (Putnam et al.), and U.S. Pat. No. 8,329,783 (Nair et al.).

The polymers used in the oil phase of the first emulsion used to prepare the porous particles can provide the continuous polymeric binder of the porous particles of this invention. Such polymers include but are not limited to, homopolymers and copolymers such as polyesters, styrenic polymers (for example polystyrene and polychlorostyrene), mono-olefin polymers (for example, polymers formed from one or more of ethylene, propylene, butylene, and isoprene), vinyl ester polymers (for example, polymer formed from one or more of vinyl acetate, vinyl propionate, vinyl benzoate, and vinyl butyrate), polymers formed from one or more α-methylene aliphatic monocarboxylic acid esters (for example, polymers formed from one or more of methyl acrylate, ethyl acrylate, butyl acrylate, dodecyl acrylate, octyl acrylate, phenyl acrylate, methyl methacrylate, ethyl methacrylate, butyl methacrylate, and dodecyl methacrylate), vinyl ether polymers (such as polymers formed from one or more of vinyl methyl ether, vinyl ethyl ether, and vinyl butyl ether), and vinyl ketone polymers (for example, polymers formed from one or more of vinyl methyl ketone, vinyl hexyl ketone, and vinyl isopropenyl ketone). Particularly useful polymers include polystyrenes (including polymers of styrene derivatives), polyesters, styrene/alkyl acrylate copolymers, styrene/alkyl methacrylate copolymers, styrene/acrylonitrile copolymers, styrene/butadiene copolymers, styrene/maleic anhydride copolymers, polyethylene resins, and polypropylene resins. Other useful polymers include polyurethanes, urethane acrylic copolymers, epoxy resins, silicone resins, and polyamide resins. Still other useful polymers are polyesters of aromatic or aliphatic polycarboxylic acids with one or more aliphatic diols, such as polyesters of isophthalic or terephthalic or fumaric acid with diols such as ethylene glycol, cyclohexane dimethanol, and bisphenol adducts of ethylene or propylene oxides. The acid values (expressed as milligrams of potassium hydroxide per gram of resin) of the polyester resins are generally in the range of from 2 to 100. The polyesters can be saturated or unsaturated. Other useful polyesters include biodegradable polymers such lactic acid polymers, glycolic acid polymers, caprolactone polymers and hydroxybutyric acid polymers. Other useful polymers include polymers derived from cellulose such as cellulose acetate, cellulose acetate butyrate, and cellulose acetate propionate.

The continuous polymeric binder of the porous particles of this invention can also be derived from ethylenically unsaturated polymerizable monomers and polyfunctional reactive compounds as described for example in U.S. Patent Application Publication 2013/0030070 (noted above).

The porous particles are generally present in the opacifying layer in an amount of at least 40 weight % and up to and including 90 weight %, or typically at least 50 weight % and up to and including 80 weight %, based on the total dry weight of the opacifying layer (that is, the total layer solids).

Opacifying and Tinting Colorants:

The opacifying colorants used in the present invention can be a single colorant or chosen from any suitable combination of colorants such that the single or multiple colorants form the "opacifying colorant" that absorbs predetermined electromagnetic radiation to provide the blackout properties as described above. Opacifying colorants can be soluble dyes or pigments or combinations of each or both types of materials.

The one or more opacifying colorants are present within the pores of the porous particles or within the continuous polymeric binder of the porous particles, or within both the pores and continuous polymeric binder of the porous particles.

As used herein, an "opacifying colorant" includes one or more colorant materials that are chosen, individually or in combination, to provide the blocking of predetermined electromagnetic radiation (for example, visible electromagnetic radiation of from 380 nm to 780 nm). While the opacifying colorants can provide some coloration or desired hue, they are not purposely chosen for this purpose.

Examples of opacifying colorant that can be used individually or in combination include but are not limited to, neutral or black pigments or dyes, and are not limited to, carbon black, black iron oxide, graphite, aniline black, anthraquinone black, and combinations of colored pigments or dyes such as cyan, magenta, yellow, green, orange, blue, red and, violet dyes. The present invention is not limited to only the specific opacifying colorants described herein but these are considered only as representative and as suitable guidance for a skilled worker to devise other combinations of opacifying colorants for the desired absorption in the predetermined electromagnetic radiation. A carbon black is particularly useful as an opacifying colorant, of which there are many types available from commercial sources.

The opacifying colorant is generally present in the opacifying layer in an amount of at least 0.001 weight % and up to and including 0.3 weight %, or even at least 0.003 weight % and up to and including 0.1 weight %, all based on the total dry weight of the opacifying layer (that is, the total layer solids). Mixtures of the noted opacifying colorants can be used if desired and these amounts also refer to the total amounts of opacifying colorants. For example, as noted above, an opacifying colorant can comprise a combination of two or more component colorants (such as a combination of dyes or a combination of pigments) designed in hues and amounts so that the combination meets the properties described herein for the "opacifying colorant". In some embodiments, a combination of component colorants can be designed in hue and amounts so that the combination performs as an opacifying colorant as well as providing desired hue or coloration as a "tinting colorant".

In some embodiments, the opacifying colorants, if pigments, are generally milled to a fine particle size and then encapsulated within the pores of the porous particles. Alternatively, the opacifying colorant can be incorporated within the continuous polymeric binder of the porous particles. Such arrangements can be achieved during the manufacture of the porous particles using the teaching provided herein and teaching provided in references cited herein. For example, in some embodiments, it can be useful to incorporate or dispose at least 95% (by weight) of the total opacifying colorant (or combination of component colorants) within the porous particles (either in the pores, continuous polymeric binder, or both), and the remainder, if any, is within the matrix polymer. However, in many embodiments, 100% of the opacifying colorant is within the porous particles. For example, at least 95% of the total opacifying colorant can be disposed or incorporated within the continuous polymeric binder of the porous particles, and the remainder can be incorporated into the pores of the same or different porous particles in the opacifying layer.

The opacifying colorants useful in the practice of this invention can be incorporated into the pores of individual porous particles for example, by incorporating them in a first water phase to form a water-in-oil emulsion or in the walls of the individual porous particles by incorporating them in the oil phase. In a particular embodiment, an opacifying colorant can be incorporated into the first aqueous phase in the form of a milled solid particle dispersions of the reactant. Preparation of milled solid particle dispersions can include combining the opacifying colorant particles to be reduced in size with a dispersant and a liquid medium such as water or ethyl acetate (when the opacifying colorant is incorporated in the solid continuous polymeric phase of the particle) in which the porous particles are to be dispersed, in a suitable grinding mill in which the porous particles are reduced in size and dispersed. The dispersant, an important ingredient in the milling, can be chosen to allow the opacifying colorant particles to be milled in the liquid medium down to a size small enough for incorporation into the pores of the porous particles and alternatively, for the final opacifying layer composition in which it is used. The dispersants can be selected to obtain efficient opacifying colorant particle size reduction during milling, provide good colloidal stability of the opacifying colorant particles to prevent agglomeration after milling and impart the desired properties of the final opacifying layer composition containing the opacifying colorant particles and the porous particles containing them.

Besides the opacifying colorants, the opacifying layers in the articles of this invention can also comprise one or more "tinting colorants" that can be used to provide a specific observable color, coloration, or hue in the articles. These materials are not chosen particularly to provide the opacifying property described above for the opacifying colorants.

One or more tinting colorants can be present in the opacifying layer and can be different in composition and amount from each other. The desired coloration or hue can be a specific color or can be used in combination with the opacifying colorant to offset or modify the original color of the article to cause more whiteness in the opacifying layer. The one or more tinting colorants can be inside or outside the porous particles or they can be incorporated into the matrix polymer.

It is also possible for a tinting colorant to be incorporated within non-porous particles or a different set of porous particles that do not contain any opacifying colorant. Such non-porous or different set of porous particles can have the same or different chemical composition as the porous particles containing the opacifying colorant. If such tinting colorants are incorporated into a different set of porous particles, such porous particles can be designed similarly or differently than the first set of porous particles comprising opacifying colorants, for example having the same or different size or number of pores.

As would be apparent, the one or more tinting colorants can be incorporated into multiple locations in the opacifying layer, in various proportions.

One or more tinting colorants can be present in the opacifying layer in an amount of at least 0.001 weight %, or more typically at least 0.15 weight %, based on the total dry weight of the opacifying layer (that is, the total layer solids). Tinting colorants can be dyes or pigments that are soluble or dispersible in solvents and monomers used for making the porous particles, and in solvents used for coating.

As noted above, an opacifying colorant and a tinting colorant can be chosen to have different properties besides their opacifying or coloration effects. In some embodiments, the opacifying colorant is a carbon black, many of which are known and available in the art, and the tinting colorant is purposely chosen to be other than a carbon black such as a cyan, magenta, yellow pigment or dye that absorbs in a region of the visible electromagnetic spectrum to produce the desired coloration or hue.

Some embodiments of the present invention can be used with the following features:

(a) the opacifying colorant is present in either or both of the pores and continuous polymeric binder of the porous particles, and the article further comprises one or more tinting colorants in either or both of the pores and continuous polymeric binder of the same porous particles;

(b) the opacifying colorant is present only in either or both of the pores and continuous polymeric binder of the porous particles, and the article further comprises one or more tinting colorants only in either or both of the pores and continuous polymeric binder of the same porous particles;

(c) the opacifying colorant is present in either or both of the pores and continuous polymeric binder of the porous particles, and the article further comprises a second set of porous particles and one or more tinting colorants in either or both of the pores and continuous polymeric binder of the second set of porous particles;

(d) the opacifying colorant is present only in either or both of the pores and continuous polymeric binder of the porous particles, and the article further comprises a second set of porous particles and one or more tinting colorants only in either or both of the pores and continuous polymeric binder of the second set of porous particles;

(e) the opacifying colorant is present in either or both of the pores and continuous polymeric binder of the porous particles, and the article further comprises one or more tinting colorants in the matrix polymer;

(f) the opacifying colorant is present in either or both of the pores and continuous polymeric binder of the porous particles, and the article further comprises one or more tinting colorants only in the matrix polymer;

(g) the opacifying colorant is present in either or both of the pores and continuous polymeric binder of the porous particles, and the article further comprises non-porous particles and one or more tinting colorants within these non-porous particles;

(h) the opacifying colorant is present in the matrix polymer, and the article further comprises one or more tinting colorants in either or both of the pores and continuous polymeric binder of the porous particles;

(i) the opacifying colorant is present only in the matrix polymer, and the article further comprises one or more tinting colorants only in either or both of the pores and continuous polymeric binder of the porous particles;

(j) the opacifying colorant is present in either or both of the pores and continuous polymeric binder of the porous particles, and the article further comprises a second set of porous particles that contain no colorants; and (k) the opacifying colorant is present in either or both of the pores and continuous polymeric binder of the porous particles, wherein the porous particles further comprises a second set of discrete pores that contain no colorants.

Matrix Polymer:

The opacifying layer of this invention also comprises a matrix polymer (or mixture of polymers forming the "matrix polymer") in which the porous particles, opacifying colorant and optional one or more tinting colorants are dispersed.

It is particularly useful that the matrix polymer of the opacifying layer: (a) is water soluble or water dispersible, (b) it is capable of forming a stable coating composition with the porous particles, opacifying colorants, and any other additives such as tinting colorants, (c) is capable of being coated by techniques practiced in the art, (d) has film-forming properties when applied to a substrate (described below), (e) is capable of being dried and where desired also crosslinked, and (f) has good light and heat stability.

In some embodiments, the matrix polymer provides an article on a substrate that has good durability to laundering, can be tailored to size by sewing, and exhibits no carbon show-through during sewing. In addition the matrix polymer can provides a supple feel to touch and flexibility especially when coated over a fabric that is meant for window dressings such as draperies. Thus, the matrix polymer is useful in the opacifying layer composition for binding together and adhering the porous particles and all colorants onto the substrate and to provide integrity to an applied opacifying layer.

The matrix polymer can include one or more organic polymers that are film forming and can be formed as a suspension or emulsion or in solution. It can include polymers that are not crosslinking and to which additional crosslinking agents are not added, or it can include polymer to which crosslinking agents are added and are thus capable of being crosslinked under appropriate conditions.

Useful matrix polymers include but are not limited, to poly(vinyl alcohol), poly(vinyl pyrrolidone), ethylene oxide polymers, polyurethanes, urethane-acrylic copolymers, other acrylic polymers, styrene-acrylic copolymers, vinyl polymers, and polyesters, silicone polymers or a combination of two or more of these organic polymers. Such matrix polymers are readily available from various commercial sources or prepared using known starting materials and synthetic conditions. The matrix polymer can be anionic, cationic or nonionic in total charge. A useful class of film-forming matrix polymers includes aqueous latex polymer dispersions such as acrylic latexes that can be ionic or nonionic colloidal dispersions of acrylate polymers and copolymers. Film-forming aqueous latexes suitable for use include styrene-butadiene latexes, poly(vinyl chloride) and poly(vinylidene chloride) latexes, poly(vinyl pyridine) latexes, and poly(acrylonitrile) latexes. Examples of suitable commercially available useful matrix polymers include those sold by DSM under the trade names NeoRez® A-1150, NeoCryl® A-6093, by Dow under the trade name Rhoplex® NW-1845K and by BASF under the tradenames Butofan N® S144 and Butofan® NS 222.

The matrix polymer generally has a glass transition temperature that is less than 25° C., and more likely equal to or less than 0° C. in order to make the dry opacifying layer flexible, rubbery, and crack-free. Glass transition temperature can be determined using known procedures and such values are already known for many polymers useful in this invention. The matrix polymer desirably has adequate flexibility and tensile strength in order to maintain integrity upon handling, especially for use with textile substrates.

The matrix polymer can optionally be crosslinked with a crosslinking agent that is included in the opacifying layer formulation and which is activated chemically with heat, radiation, or other means in order to provide enhanced integrity and wash durability of the resulting article. The crosslinking agent serves to provide improved insolubility of the opacifying layer in water and adhesion to the substrate or optional underlying layer. The crosslinking agent is a chemical having functional groups capable of reacting with reactive sites on the latex polymer under curing conditions to thereby produce a crosslinked structure. Examples of suitable crosslinking agents include multi-functional aziridines, aldehydes, and epoxides.

Drying and optional crosslinking of the matrix polymer in the opacifying layer formulation can be accomplished by suitable means such as by heating, and various mechanisms can be employed for crosslinking the matrix polymer. For example, the crosslinking can involve condensation or addition reactions promoted by heat or radiation. In one embodiment, a latex composition is used as the matrix polymer. Upon heating, the latex film dries, with a crosslinking reaction taking place between the reactive side groups of the polymer chains. If the particular latex polymer used is not itself heat reactive, then suitable catalysts or crosslinking agents can be added to promote crosslinking upon heating.

In addition, the matrix polymer provides control of the void spacing (interstitial voids or volume) among porous particles to optimize light scattering to provide greatest light blocking capacity and whiter dry coatings. Greater interstitial void volume near the surface results in a more diffuse surface and decreases the internal reflections of back scattered light. As a result, a whiter surface will be observed. The porous particles used in the opacifying layer produce larger interstitial voids among themselves than is achieved using smaller single point scattering pigments such as titanium dioxide or smaller single pore microspheres known in the art. The larger interstitial voids can be controlled by the amount of matrix polymer to optimize opacity caused by the air among the porous particles. The interstitial void size can be further optimized by the control of polydispersity and shape of the porous particles with little impact on the scattering from the pores within the porous particles. Both the polydispersity and shape of the porous particle are easily controlled in the present invention by means of the process for making those materials.

The matrix polymer can be present in the opacifying layer in an amount of at least 10 weight % and up to and including 60 weight %, or typically at least 20 weight % and up to and including 50 weight %, based on the total dry weight of the opacifying layer (that is, total layer solids).

Substrates

While the opacifying layer can be "free-standing" and used as the only layer or structure in the article, in many embodiments, the opacifying layer is disposed on a substrate.

The substrates onto which the opacifying layers of the invention and optionally the underlying layer can be formed or disposed can comprise various woven and nonwoven textile fabrics such as nylon, polyester, cotton, glass, aramide, rayon, polyolefin, acrylic wool and felt polymeric films [such as films derived from triacetyl cellulose, polyethylene terephthalate (PET), diacetyl cellulose, acetate butyrate cellulose, acetate propionate cellulose, polyether sulfone, polyacrylic based resin, for example, poly(methyl methacrylate), a polyurethane-based resin, polyester, polycarbonate, aromatic polyamide, polyolefins (for example, polyethylene and polypropylene), polymers derived from vinyl chloride (for example, polyvinyl chloride and a vinyl chloride/vinyl acetate copolymer), polyvinyl alcohol, polysulfone, polyether, polynorbornene, polymethylpentene, polyether ketone, (meth)acrylonitrile], paper or other cellulosic materials, canvases, wood, metals, plaster and other materials that would be apparent to one skilled in the art. The substrates can vary in thickness, suitable for the desired application. Particularly useful substrates comprise a textile web, polymer, cellulosic material, glass, or ceramic. Textiles and fabrics are more useful so that the resulting articles are readily useful as window dressings.

Polymeric film, textile, and cellulosic substrates can be surface treated by various processes including corona discharge, glow discharge, UV or ozone exposure, flame, or solvent washing in order to promote adhesion of coating compositions.

The thickness of the substrate is not critical and can be designed for a given use of the resulting article. In most embodiments, the dry substrate thickness is at least 50 µm.

Underlying Layers

Depending upon the use being considered, the article of this invention can further comprise an underlying layer, an undercoat, or primer (polymeric subbing) layer disposed directly on the substrate and between it and the opacifying layer. Subbing layers that can be used to promote the adhesion of applied opacifying layer compositions to the substrate are well known in the art and any such compositions can be used. Some useful subbing compositions include but are not limited to polymers derived from vinylidene chloride such as vinylidene chloride/methyl acrylate/itaconic acid terpolymers and vinylidene chloride/acrylonitrile/acrylic acid terpolymers. These and other suitable subbing compositions are described in numerous publications and well known in the photographic coating art. A polymeric subbing layer can additionally be overcoated with a second subbing layer comprised of a gelatin (typically referred to as a "gel sub").

In addition, an underlying layer can be disposed between the substrate and the opacifying layer to improve adhesion between the two materials, especially if the substrate is a flexible textile material. The underlying layer can be any material that maintains its flexibility and integrity and prevents cracking upon drying such as described above for the matrix polymers and in one embodiment can be the same as the matrix polymer used in the overlying opacifying layer. Particularly useful polymeric materials useful for forming the underlying layer are polymers that provide the underlying layer with a glass transition temperature below 25° C. For example, such useful polymeric materials include but are not restricted to acrylic polymers, styrene-acrylic copolymers, vinyl polymers, polyurethanes, silicones, or a combination of two or more of these polymers, rubbers and latexes made from 1,3-butadiene, including, but not limited to styrene butadiene, polybutadiene, polychloroprene (Neoprene) and nitrile rubbers. Examples of suitable commercially available polymers for the underlying layer are those sold under the tradenames Butonal® NS 175 (BASF) and Hystretch V29® (Lubrizol Corp.).

The underlying layer can be porous or have foam-like character or it can be non-porous and a solid film. In addition, the underlying layer can include relatively small amounts of other materials such as crosslinking agents, thickeners, emulsifiers, pH control agents, free radical scavengers and other addenda that would be readily apparent to one skilled in the art. In some embodiments, the underlying layer is a foamed layer that contains light scattering pigments such as titanium dioxide.

Coating Formulations and Methods

The various layer formulations used in the practice of this invention comprise an aqueous solution of the desired components. For example, the opacifying layer formulation typically comprises porous particles containing an opacifying colorant, a matrix polymer, and optional tinting colorants, all mixed together in water to form a stable aqueous dispersion. The opacifying layer formulation generally has relatively high solids content, for example at least 25%.

If the solids content is lower, thickeners can be included to enhance the formulation viscosity if desired. Known thickeners can also be utilized to control the rheology of the opacifying layer formulation depending upon the method used to apply it to a substrate (or underlying layer). Particularly useful rheology modifiers are Rheovis® PU 1214 (BASF) and Acrysol® G111 (Dow Chemical Company).

One skilled in the art would understand that other coating vehicles can be used, including high vapor pressure organic solvents either alone or in combination with water to obtain the desired formulation quality.

The layer formulations described herein can contain additives such as flame retardants, light stabilizers, preservatives, antimicrobials, biocides, surfactants, defoamers, and leveling and pH control agents, in order to achieve the desired properties of the layer formulations for application to the substrate or underlying layers. It is desirable that the various layer formulations have good wetting and film-forming properties. Materials such as silicones can be incorporated into the formulations to aid in leveling them on the surface of the substrate or any underlying layer to provide a smooth finish.

The opacifying layer formulation can be applied and dried to provide an ink receptive surface for any digital printing on the resulting article of this invention.

The opacifying and underlying layer formulations can be thusly prepared and coated or otherwise applied onto a substrate by any of a number of well known techniques, such as wrapped wire rod coating, blade coating, spray coating, air knife coating, gravure coating, reverse roll coating, slot coating, extrusion hopper coating, slide coating, curtain coating, spray coating, foam coating, froth coating, rotary screen coating, pad coating, and other techniques that would be readily apparent to one skilled in the art.

After application of the opacifying layer formulation (and underlying layer formulation if used) to the substrate, each formulation is generally dried by simple evaporation of water (and any other solvents) from the applied formulation and from the pores of the porous particles, which drying can be accelerated by known techniques such as convection heating to provide an article of the present invention. Further details of coating and drying techniques are described in further detail in Research Disclosure No. 308119, December 1989, pages 1007-1008 and in references cited therein.

The resulting articles can have any desired overall average dry thickness, but in most embodiments, the overall average dry thickness is at least 50 μm or typically at least 100 μm. This overall average thickness includes the any dry substrate thickness described above (including any subbing or adhesion layers) as well as an average dry thickness of the opacifying layer of at least 50 μm (for example, this can be the same dry thickness of the article when there is no substrate or other layers). All of these "average" dry thicknesses are estimated from the coating formulation and the wet coverage.

The present invention provides at least the following embodiments and combinations thereof, but other combinations of features are considered to be within the present invention as a skilled artisan would appreciate from the teaching of this disclosure:

1. An article comprising an opacifying layer that is capable of blocking predetermined electromagnetic radiation, the article comprising:

(a) porous particles comprising a continuous polymeric binder and pores within the continuous polymeric binder, the porous particles having a glass transition temperature of at least 25° C. and a mode particle size of at least 2 μm and up to and including 50 μm, (b) an opacifying colorant that absorbs the predetermined electromagnetic radiation, the opacifying colorant being present in an amount of at least 0.001 weight % based on the total dry weight of the opacifying layer, and (c) a matrix polymer in which the porous particles and opacifying colorant are dispersed.

2. The article of embodiment 1, wherein the opacifying layer has a CIELAB L* value greater than 70.

3. The article of embodiment 1 or 2, wherein the opacifying colorant is present within the pores of the porous particles or within the continuous polymeric binder of the porous particles, or within both the pores and continuous polymeric binder of the porous particles.

4. The article of any of embodiments 1 to 3, wherein at least 95 weight % and up to and including 100 weight % of the total opacifying colorant is within the porous particles.

5. The article of any of embodiments 1 to 4, wherein the predetermined electromagnetic radiation is visible radiation of from 380 nm to 780 nm.

6. The article of any of embodiments 1 to 5, further comprising a substrate on which the opacifying layer is disposed.

7. The article of any of embodiments 1 to 6, wherein the opacifying layer is disposed on a substrate that comprises a textile web, polymer, cellulosic material, glass, or ceramic.

8. The article of embodiment 6 or 7, further comprising an underlying layer that has a glass transition temperature below 25° C. and that is disposed between the substrate and the opacifying layer.

9. The article of any of embodiments 1 to 8, wherein the matrix polymer has a glass transition temperature that is less than 25° C.

10. The article of any of embodiments 1 to 9, wherein the opacifying colorant is a carbon black.

11. The article of any of embodiments 1 to 10, wherein the opacifying colorant comprises a combination of two or more component colorants.

12. The article of any of embodiments 1 to 11, wherein the opacifying colorant is present in the opacifying layer in an amount of at least 0.003 weight % and up to and including 0.1 weight % based on the total dry weight of the opacifying layer.

13. The article of any of embodiments 1 to 12, wherein the porous particles comprise a plurality of discrete pores having an average pore size of at least 100 nm and up to and including 4,000 nm.

14. The article of any of embodiments 1 to 13, wherein the porous particles have porosity of at least 10% and up to and including 70%.

15. The article of any of embodiments 1 to 14, wherein the porous particles have a mode particle size of at least 3 μm and up to and including 40 μm.

16. The article of any of embodiments 1 to 15, wherein the opacifying layer has an average dry thickness of at least 50 μm.

17. The article of any of embodiments 1 to 16 that is capable of blocking at least 70% of the predetermined electromagnetic radiation compared to a control article from which the porous particles have been omitted with the proviso that the CIELAB L* value is greater than 70.

18. The article of any of embodiments 1 to 17 further comprising a tinting colorant other than the opacifying colorant in the opacifying layer in an amount of at least 0.001 weight % based on the total dry weight of the opacifying layer.

19. The article of any of embodiments 1 to 18, wherein the opacifying layer has an interstitial void volume of less than 30 volume %.

20. The article of any of embodiments 1 to 19, further selected from one of the following embodiments:

(a) the opacifying colorant is present in either or both of the pores and continuous polymeric binder of the porous particles, and the article further comprises one or more tinting colorants in either or both of the pores and continuous polymeric binder of the same porous particles;

(b) the opacifying colorant is present only in either or both of the pores and continuous polymeric binder of the porous particles, and the article further comprises one or more tinting colorants only in either or both of the pores and continuous polymeric binder of the same porous particles;

(c) the opacifying colorant is present in either or both of the pores and continuous polymeric binder of the porous particles, and the article further comprises a second set of porous particles and one or more tinting colorants in either or both of the pores and continuous polymeric binder of the second set of porous particles;

(d) the opacifying colorant is present only in either or both of the pores and continuous polymeric binder of the porous particles, and the article further comprises a second set of porous particles and one or more tinting colorants only in either or both of the pores and continuous polymeric binder of the second set of porous particles;

(e) the opacifying colorant is present in either or both of the pores and continuous polymeric binder of the porous particles, and the article further comprises one or more tinting colorants in the matrix polymer;

(f) the opacifying colorant is present in either or both of the pores and continuous polymeric binder of the porous particles, and the article further comprises one or more tinting colorants only in the matrix polymer;

(g) the opacifying colorant is present in either or both of the pores and continuous polymeric binder of the porous particles, and the article further comprises non-porous particles and one or more tinting colorants within these non-porous particles;

(h) the opacifying colorant is present in the matrix polymer, and the article further comprises one or more tinting colorants in either or both of the pores and continuous polymeric binder of the porous particles;

(i) the opacifying colorant is present only in the matrix polymer, and the article further comprises one or more tinting colorants only in either or both of the pores and continuous polymeric binder of the porous particles;

(j) the opacifying colorant is present in either or both of the pores and continuous polymeric binder of the porous particles, and the article further comprises a second set of porous particles that contain no colorants; and (k) the opacifying colorant is present in either or both of the pores and continuous polymeric binder of the porous particles, wherein the porous particles further comprises a second set of discrete pores that contain no colorants.

The following Examples are provided to illustrate the practice of this invention and are not meant to be limiting in any manner.

The following materials used in the Examples:

The polyesters, Kao E and Kao N were obtained from Kao Specialties Americas LLC, a part of Kao Corporation (Japan).

Nalco® 1060 containing colloidal silica can be obtained from Nalco Chemical Company as a 50 weight % aqueous dispersion.

The poly(methylamino ethanol adipate) (AMAE) co-stabilizer was prepared using known procedures and starting materials.

Carboxy methylcellulose CMC-1, 250,000 kDa was obtained from Acros Organics or from Ashland Aqualon as Aqualon 9M31F. These products were used interchangeably.

Carboxy methylcellulose CMC-2, 80 kDa was obtained from Sigma-Aldrich Co.

NeoCryl® A-6093, a copolymer derived from butyl methacrylate and methyl methacrylate (Tg, −30° C.), NeoCryl® A-1120, a self-crosslinking acrylic emulsion (Tg, −30° C.) and NeoRez® A-1150, a polyurethane latex, were all obtained from DSM.

Butonal® NS 175, an anionic styrene-butadiene copolymer (Tg, −53° C.) and Butofan® NS 144, a carboxylated styrene-butadiene copolymer (Tg, −48° C.), were both obtained from BASF.

Rhoplex® NW-1845K, an acrylic latex (Tg, −21° C.), was obtained from Dow.

Solsperse® 43000, a 50% active alkylphenol ethoxylated (APE)-free polymeric dispersant in water, was obtained from Lubrizol Corp.

Solsperse® 32000, Solsperse® 35000, and Solsperse® 39000, polyester-grafted polyethyleneimine dispersants, were all obtained from Lubrizol Corp.

Solsperse® 12000, a monosulfonated copper phthalocyanine derivative, and Solpserse® 22000, a mixture of mono-sulfonated and bis-sulfonated derivatives of PY12, were both obtained from Lubrizol Corp.

Disperbyk® 190, a copolymer of polystyrene, polypropylene glycol and polyethylene glycol and Disperbyk® 192, a copolymer with pigment affinic groups, were obtained from BYK-chemie USA.

Zetasperse® 2100, a derivative of ethoxylated C6-C12 alcohols and polyoxyalkylene amine, was obtained from Air Products and Chemicals, Inc.

Tergitol® 15-S-7, a C12-C14 secondary. alcohol with HLB=12.4, was obtained from the Dow Chemical Corp.

Capstone® FS-31, a nonionic fluorosurfactant, was obtained from DuPont.

The first colorant and first tinting colorants used in the Examples were carbon black, cyan, magenta and yellow pigments. The carbon black (K) pigment used as an aqueous dispersion was Regal 330 (Cabot Corp.) and was hydrophobically surface modified. The carbon black used as a non-aqueous dispersion was Black Pearls 280 obtained from Cabot Corp.

The cyan (C) pigment PB 15:3 (Sunfast Blue 15:3) was obtained from Sun Chemicals. The magenta (M) pigment PR 185 (Graphtol Carmine HF4C) was obtained from Clariant Corp. The yellow (Y) pigment PY 185 (Paliotol Gelb D1155) was obtained from BASF. The titanium dioxide (T) pigment (Kronos 2310) was obtained from Kronos Inc. Opacifying formulations used to prepare the opacifying layers were prepared as described below and coated on various substrates using various coating knives. Each coating was dried under ambient conditions with controlled temperatures.

Substrate 1 was a 0.1 mm poly(ethylene terephthalate) (PET) film coated with a subbing layer comprising a terpolymer derived from acrylonitrile, vinylidene chloride and acrylic acid.

Substrate 2 was Substrate 1 overcoated with gelatin.

Substrate 3 was a Leneta card form 2C-opacity (Lenta Company).

Substrate 4 was a woven polyester fabric with a foamed undercoat typically containing a mixture of clay, titania, and a rubbery latex.

Substrate 5 was a woven polyester fabric with an undercoat containing Butonal® NS 175 at a thickness of approximately 125 to 150 µm.

Substrate 6 was a woven polyester fabric with an undercoat containing a mixture of 50 weight % NeoCryl® A-1120 and 50 weight % NeoCryl® A-6093 at a thickness of approximately 125 to 150 µm.

Measurements:

The particle size distribution of the opacifying colorant dispersions was measured using the Malvern Zetasizer, Model ZEN, and the reported sizes were the volume weighted mean sizes.

The transparency depth was used to measure the opacifying ability of the coatings. It is inversely related to opacity and is defined as the depth in an opacifying layer at which the intensity of the light falls to 10% (transmission density of 1) of the original value. It is obtained by the natural logarithm of 10 divided by the attenuation (accounting for scattering and absorption) coefficient.

In order to obtain the transparency depth ×10 and whiteness $L^*_\infty$ of the opacifying layers used in this invention, the opacifying layer was coated on each of Substrates 1, 2, and 3. Two coatings of 4 mil (0.01 cm) and 8 mil (0.02 cm) thickness were made on Substrate 1 or 2, and two coatings of 60 µm and 120 µm were made on Substrate 3 for each opacifying coating formulation. The coated thicknesses of opacifying layers were estimated from the wet film coverage, the solids content, and the density of the components.

The transmission measurements of the coated opacifying layer on each of Substrates 1 or 2 were made using an X-rite 310 spectrophotometer. The luminous reflectance (visual reflectance) measurements of all opacifying layers were made over the white and black areas of Substrate 3 using a Greytag Macbeth Spectralino spectrophotometer. The data were fit with the K-M model to obtain the transparency depth $X_{10}$ and the reflection of the opacifying layers at infinite thickness $R_\infty$. The reflectance at infinite thickness $R_\infty$ was the used to calculate the expected lightness L*, at infinite thickness using the correlation described earlier.

The data for coatings without electromagnetic radiation absorbing first colorant were fit using the modification the usual K-M method described above where no absorbance parameter is needed. The relationship between transmittance and dry coating thickness is not exponential and as a result the transparency depth, $X_{10}$, does not apply.

Additional Evaluation of Opacifying Layers for Light Blocking Properties:

The light blocking ability of the articles in transmitted light was evaluated by observing the extent of light coming through the article in a darkened room from a diffuse light source, such as a flashlight, held behind Substrate 4, 5 or 6 coated with approximately a 300 μm coating of the opacifying layer.

Preparation of Colorant Dispersions for Porous Particles and Opacifying Layers:

All colorant dispersions were prepared by combining dry pigment, a dispersant, and a liquid in a suitable milling vessel. The particle size of each pigment was reduced by milling it using ceramic media until all particles were reduced below a diameter of 1 μm as determined by optical microscopy. After milling each pigment dispersion was separated from the milling media. The colorant dispersions were further diluted in the same medium for incorporation into porous particle or opacifying layer formulations. The colorant dispersions varied in the type of pigment, dispersant, dispersant level relative to pigment, and dispersing medium, as shown below in TABLE I. Dv is the volume weighted mean diameter, in nanometers. In TABLE I, the Colorant Dispersion is identified by one or more colorants (K, T, C, M, or Y) and the dispersing medium of water (W) or ethyl acetate (EA).

SP: Non-Porous (Solid) Particles Containing Opacifying Colorant (K):

A 20 weight % solution (260 g) of polyester Kao E containing 1.04 g of dispersion colorant dispersion K-EA was added to 368 g of an aqueous phase having 2.3 g of potassium hydrogen phthalate as a pH 4 buffer agent, 27 g of Nalco® 1060, and 2.7 g of AMAE co-stabilizer, and homogenized for two minutes at 6800 RPM using a Silverson L4R homogenizer. The resulting oil-in-water emulsion was further homogenized using a Microfluidizer Model #110T from Microfluidics at a pressure of 9800 psi (690 $kg_f/cm^2$), diluted with an equal weight of water and the ethyl acetate evaporated using a Heidolph Laborata rotary evaporator at 40° C. under reduced pressure. The resulting suspension of non-porous particles was filtered using a glass flitted funnel and washed with water several times followed by rinsing with a 1.5 weight % solution of Tergitol® 15-S-7. The isolated non-porous particles were then air dried.

P1: Preparation of Porous Particles Having No Opacifying Colorant:

A 1.95 weight % solution (154 g) of CMC-1 was dispersed in 500 grams of a 20 weight % solution of polyester Kao N in ethyl acetate for two minutes at 6800 RPM using a Silverson L4R homogenizer. The resulting water-in-oil emulsion was further homogenized using a Microfluidizer Model #110T from Microfluidics at a pressure of 9800 psi (690 $kg_f/cm^2$). A 560 g aliquot of the resulting very fine water-in-oil emulsion was dispersed, using the Silverson homogenizer again for two minutes at 2800 RPM, in 930 grams of a second water phase comprising a 207 mmolar pH 4 citrate-phosphate buffer and 62 grams of Nalco® 1060, followed by homogenization in a orifice homogenizer at 1000 psi (70.4 $kg_f/cm^2$) to form a water-in-oil-in-water double emulsion. The ethyl acetate was evaporated using a

TABLE I

Colorant Dispersions

| Colorant Dispersion | Pigment | Dispersant (by weight % of pigment) | Dispersing medium | Colorant Weight % | Dv (nm) |
|---|---|---|---|---|---|
| K-W | K | Solsperse ® 43000 (25) | Water | 1.0 | 113 |
| T-W | T | Disperbyk ® 192 (20) | Water | 23.3 | 190 |
| C-W | C | Solsperse ® 43000 (30) | Water | 5.0 | 139 |
| M-W | M | Disperbyk ® 190 (20) | Water | 5.1 | 552 |
| Y-W | Y | Solsperse ® 43000 (30) | Water | 8.0 | 669 |
| CMY-W | C + M + Y | As in C-W, M-W, and Y-W | Water | 0.95 (C) + 1.32 (M) + 1.73 (Y) | Combination of C-W, M-W, and Y-W |
| K-EA | K | Zetasperse ® 2100 (5) + Kao N (50) | Ethyl Acetate | 1.5 | 191 |
| C-EA | C | Solsperse ® 32000 + Solsperse ® 12000 (25 + 6) | Ethyl Acetate | 5.0 | 144 |

Preparation of Porous Particles (P) and Nonporous Particles (SP):

The various porous and non-porous particles used for preparing an opacifying layer for each Invention Example and Comparative Example are described below and TABLE II below summarizes the characteristics of the particles.

Heidolph Laborata rotary evaporator at 40° C. under reduced pressure after dilution of the double emulsion with an equal weight of water. The resulting suspension of porous particles was filtered using a glass flitted funnel and washed with water several times and followed by rinsing with a 1.5 weight % solution of Tergitol® 15-S-7. The isolated porous particles were then air dried. Typically the pores contained within the porous particles prepared according to this procedure had an average diameter of from 150 nm up to 1,500 nm.

P2: Preparation of Invention Porous Particles Containing Opacifying Colorant (K) in the Pores:

These porous particles used according to the present invention were prepared in a procedure similar to that used for preparing the P1 porous particles except that colorant dispersion K-W was included in the CMC-1 solution in order to incorporate 0.03 weight % of carbon black as an opacifying colorant into the pores of the resulting porous particles.

P3: Preparation of Invention Porous Particles Containing Opacifying Colorant (CYM Combination) in the Pores:

These porous particles were prepared in a procedure similar to that used for preparing the P1 porous particles except that colorant dispersion CYM-W was included in the CMC-1 solution in order to incorporate 0.108 weight % of the mixture of colorants as an opacifying colorant into the pores of the resulting porous particles such that the covering power was similar to that obtained for the MP2 porous particles containing 0.03 weight % of carbon black.

P4: Preparation of Invention Porous Particles Containing Opacifying Colorant (K) in the Continuous Polymeric Binder:

These porous particles were prepared in a procedure similar to that used for preparing the P1 porous particles except that colorant dispersion K-W was added to the ethyl acetate solution in order to incorporate 0.02 weight % of carbon black as an opacifying colorant into the continuous polymeric binder of the resulting porous particles.

P5: Preparation of Invention Porous Particles Containing Opacifying Colorant (K) in the Pores and Tinting Colorant (C) in the Continuous Polymer Binder:

These porous particles were prepared in a procedure similar to that used for preparing the P1 porous particles except that colorant dispersion K-W was added to the CMC-1 solution in order to incorporate 0.03 weight % of carbon black as an opacifying colorant into the pores of the resulting porous particles and colorant dispersion C-EA was added to the ethyl acetate solution to incorporate 0.5 weight % of the C colorant as a tinting colorant into the continuous polymeric binder of the porous particles.

P6: Preparation of Invention Porous Particles Containing Opacifying Colorant (K) in the Pores:

These porous particles were prepared in a procedure similar to that used for preparing the P2 porous particles except that the pores of the resulting porous particles contained 0.05 weight % of carbon black as an opacifying colorant and the porous particles were made to be larger.

P7: Preparation of Invention Porous Particles Having No Opacifying Colorant (K) in the Pores:

These porous particles were prepared in a procedure similar to that used for preparing the P1 porous particles except that the water-in-oil emulsion contained 35 weight % aqueous phase instead of the 23.5 weight % used in P1 and the double emulsion was not diluted with water prior to removal of the ethyl acetate. The porous particles were also made to be smaller.

P8: Preparation of Invention Porous Particles Containing Opacifying Colorant (K) in the Pores and Tinting Colorant (C) in the Continuous Polymer Binder:

These porous particles were prepared in a procedure similar to that used for preparing the P5 porous particles except that the pores of the resulting porous particles contained 0.03 weight % of carbon black as an opacifying colorant and colorant dispersion C-EA was added to the ethyl acetate solution to incorporate 0.003 weight % of the C colorant as a tinting colorant in the continuous polymeric binder of the porous particles.

P9: Preparation of Invention Porous Particles Containing Tinting Colorant (C) in the Pores:

These porous particles were prepared in a procedure similar to that used for preparing the Pb porous particles except that the pores of the resulting porous particles contained 0.05 weight % of C colorant as a tinting colorant.

P10: Preparation of Invention Porous Particles Containing Opacifying Colorant (K) in Only One Set of Pores and No Colorant in a Second Set of Separate Pores of a Different Size in the Same Particles:

These porous particles were prepared in a procedure similar to that used for preparing the P2 porous particles except that two separate water-in-oil emulsions, each containing a different molecular weight CMC, were made and then combined before forming a water-in-oil-in-water double emulsion. A first water-in-oil emulsion was prepared by first preparing a first organic phase in ethyl acetate as made for P2 except that the polymer used was polyester Kao E, and emulsifying it with a first aqueous phase prepared with 1.9 weight % of CMC 1 containing enough of the colorant dispersion K-W in order to incorporate 0.03 weight % of carbon black as an opacifying colorant into the pores of the final porous particles. A second water-in-oil emulsion with no colorant was prepared with a second organic phase similar to that used to prepare the porous particles of P1, except that polymer used was polyester Kao E and the second aqueous phase contained 3.5 weight % solution of CMC-2. The first and second water-in-oil emulsions were mixed together in a weight ratio of 70:30, added to an aqueous phase containing silica as described in the preparation of P2 to form a water-in-oil-in-water emulsion, and converted to porous particles after dilution of the double emulsion in half its weight with water. The resulting porous particles were fractured and examined by Scanning Electron Microscopy and found to have bimodal larger and smaller pores.

TABLE II

Non-porous and Porous Particles

| Particles | Composition | Particle size (μm) | Porosity (Vol. %) |
|---|---|---|---|
| SP | Non-porous particles containing 0.03 weight % K in from K-EA | 5 | 0% |
| P1 | Porous particles; no opacifying colorant | 6 | 31% |
| P2 | Porous particles containing 0.03 weight % K from K-W | 6 | 33% |
| P3 | Porous particles containing 0.108 weight % CMY from CMY-W | 5.7 | 32% |
| P4 | Porous particles containing 0.02 weight % K from K-EA | 5.9 | 27% |
| P5 | Porous particles containing 0.03 weight % carbon black from K-W and 0.5 weight % C from C-EA | 5.7 | 31% |
| P6 | Porous particles containing 0.05 weight % K from K-W | 12.4 | 24% |
| P7 | Porous particles; no opacifying colorant | 4.9 | 29% |
| P8 | Porous Particles containing 0.03 weight % K from K-W, 0.003 weight % C from C-EA | 6.3 | 14% |
| P9 | Porous Particles containing 0.05 weight % C from C-W | 5.7 | 28% |
| P10 | Porous Particles containing 0.03 weight % K from K-W and no colorant in some pores | 5.7 | 40% |

Preparation of Coating Formulations and Coatings for the Opacifying Layers:

All opacifying layer formulations were prepared by combining a matrix polymer, a coating surfactant, water, and porous or non-porous particles in a container. Each formulation was rolled on a roller mill for at least 12 hours, mixed with a rotor stator for 30-60 seconds at 5000 rpm to remove clumps, and de-gassed to remove large bubbles. In all opacifying layer formulations, the volume fraction of the matrix polymer, NeoCryl® A-6093, Rhoplex® NW-1845K or Butofan® NS 144, varied from approximately 25 volume % to 29 volume %. The differences in particle size and porosity for the different examples were taken into consideration to maintain the same number of pores (scattering sites) per unit coated area. The concentration of Tergitol® 15-S-7 coating surfactant varied from 0.25 weight % to 1.7 weight %, and the concentration of Capstone® FS-31 coating surfactant varied from 0 weight % to 0.03 weight % in the opacifying layer formulations. The opacifying layer formulations were also varied in type of particles and colorants.

Each opacifying layer formulation was coated onto substrates described above using wire rods, coating knives, and gap coaters at ambient temperatures, and dried overnight at 40° C. The dry coverage for the opacifying layers varied depending upon the desired test method. The descriptions of the opacifying layer formulations are summarized in TABLE III below.

TABLE III

Coating Formulations

| Example | Radiation Scattering Particles (weight % in opacifying layer) | Colorant Type (Colorant Location) |
|---|---|---|
| Comparative 1 | None | Opacifying Colorant K (Matrix Polymer) |
| Comparative 2 | SP (70) | Opacifying Colorant K (SP) |
| Comparative 3 | T (1.9) | Opacifying Colorant K (Matrix Polymer) |
| Comparative 4 | P1 (62) | None |
| Invention 1 | P2 (62) | Opacifying Colorant K (Pores) |
| Invention 2 | P3 (62) | Opacifying Colorant CMY (Pores) |
| Invention 3 | P4 (64) | Opacifying Colorant K (Binder) |
| Invention 4 | P5 (62) | Opacifying Colorant K (Pores) + Tinting Colorant C (Binder) |
| Invention 5 | P1 (62) | Opacifying Colorant K (Matrix Polymer) |
| Invention 6 | P1 (62) | Opacifying Colorant K (Matrix Polymer) |
| Invention 7 | P1 (63) | Opacifying Colorant CMY (Matrix Polymer) |
| Invention 8 | P6 (41) + P7 (27) | Opacifying Colorant K (Pores of P6) |
| Invention 9 | P8 (48) + P9 (16) | [Opacifying Colorant K (Pores), Tinting Colorant C (Binder) of P8] + Tinting colorant C (Pores of P9) |
| Invention 10 | P10 (68) | Opacifying Colorant K (first set of Pores) |

Each dried opacifying layer was evaluated as described above for transmission depth and lightness and light blocking ability. The results are shown below in TABLE IV. It is desired to have maximum lightness; hence the higher the number for L*, the lighter the coatings. Lightness values of <70 are not considered acceptable due to the objectionable dark color or lack of whiteness of the layer. The smaller the penetration depth x10 values, the more efficient the transmitted light blocking ability.

TABLE IV

Opacifying Layer Properties

| Example | Opacifying Colorant (Weight % in Opacifying Layer) | Lightness $L^*_\infty$ | Transparency Depth $X_{10}$ (μm) | Flashlight Test |
|---|---|---|---|---|
| Comparative 1 | 0.030 | 7 | 598 | Poor light blocking |
| Comparative 2 | 0.023 | 33 | 426 | Poor light blocking |
| Comparative 3 | 0.021 | 56 | 201 | Poor light blocking |
| Comparative 4 | 0 | 97 | Not definable by K-M Model | Fair light blocking |
| Invention 1 | 0.020 | 83 | 125 | Good light blocking |
| Invention 2 | 0.072 | 83 | 122 | Good light blocking |
| Invention 3 | 0.0125 | 82 | 195 | Good light blocking |
| Invention 4 | 0.020 | 58 | 52 | Good light blocking |
| Invention 5 | 0.011 | 87 | 162 | Good light blocking |
| Invention 6 | 0.021 | 81 | 111 | Good light blocking |
| Invention 7 | 0.075 | 81 | 116 | Good light blocking |
| Invention 8 | 0.023 | 81 | 129 | Good light blocking |
| Invention 9 | 0.015 | 81 | 115 | Good light blocking |
| Invention 10 | 0.021 | 83 | 134 | Good light blocking |

The articles of Comparative Example 1 comprised an opacifying layer containing only carbon black at a level of 0.03 weight % as an opacifying colorant in the matrix polymer (no particles of any type). It exhibited a high transparency depth and a lightness $L^*_\infty$ of 7. This article also exhibited poor opacity and had a very dark coloration even at this low level of carbon black since it did not have the benefit of scattering from porous particles according to the present invention. The flashlight test for the article having Substrate 4 demonstrated poor light blocking.

The articles of Comparative Example 2 were prepared to have an opacifying layer derived from non-porous particles containing 0.03 weight % of carbon black as an opacifying colorant in a matrix polymer (34 volume %), resulting in an opacifying layer with 0.023 weight % of the opacifying colorant. The coating exhibited a high transparency depth and a low lightness $L^*_\infty$ of 37 indicating very little light scattering from the non-porous particles. Scattering by the interstitial voids was purposely eliminated in this Comparative Example by increasing the matrix polymer to 34 volume % to examine scattering coming from non-porous particles. The flashlight test for the article having Substrate 4 demonstrated poor light blocking.

The articles of Comparative Example 3 were made to have an opacifying layer containing 1.9 weight % of titanium dioxide (a rutile inorganic pigment), and the same nominal carbon black level as the opacifying colorant in Comparative Example 2 in the matrix polymer to provide a weight ratio of carbon black to titanium dioxide of 1:100. The matrix polymer was adjusted for the titanium dioxide loading and density to obtain a 49 volume % solids in the opacifying layer formulation similar to the volume % solids used for the opacifying layer formulations used in the Invention Examples. The articles of Comparative Example 3 were too dark and the flashlight test for the article having Substrate 4 demonstrated poor light blocking.

The articles of Comparative Example 4 were prepared to have an opacifying layer containing only porous particles and no colorants in the matrix polymer. The transparency depth could not be evaluated due to the absence of colorants. The $L^*_\infty$ value was very high due to scattering from the multiple pores of the porous particles. However, it is apparent from this result that in order to obtain a good light blocking opacifying layer in the absence of an opacifying colorant, a very high opacifying layer thickness would be required based on the solution to the two-flux equations, as described above. The flashlight test for the article having Substrate 4 demonstrated insufficient light blocking compared to Invention Examples described below.

The articles of Invention Example 1 were prepared to have an opacifying layer containing porous particles having 0.03 weight % of carbon black in their pores and a matrix polymer. The articles exhibited a decreased transparency depth compared to the articles in the Comparative Examples while exhibiting higher $L^*_\infty$, due to the synergistic effect of a small amount of opacifying colorant and the light scattering pores of the porous particles. The articles exhibited good light blocking using the flashlight test.

The articles of Invention Example 2 were similar to those of Invention Example 1 but the opacifying layer contained a mixture of CYM colorants as the opacifying colorant in amounts that resulted in electromagnetic radiation absorption similar to carbon black, which opacifying colorants were located in the pores of the porous particles to give similar covering powers as 0.03 weight % of carbon black in the pores. The transparency depth and lightness values were similar to that observed in the articles of Invention Example 1. The articles exhibited good light blocking using the flashlight test.

The articles of Invention Example 3 were similar to those of Invention Example 1 but contained 0.02 weight % of carbon black as the opacifying colorant in the binder of the porous particle. The lightness value was similar to that observed in Invention Example 1. The articles exhibited good light blocking using the flashlight test.

The articles of Invention Example 4 were similar to those prepared in Invention Example 1 except a tinting colorant was incorporated into the porous particles as well as the opacifying colorant, to add coloration or hue to the resulting opacifying layer. The lightness value was observed to be lower due to the added tinting colorant. The transparency depth was also significantly lower as the articles exhibited good light blocking properties using the flashlight test.

The articles of Invention Examples 5 and 6 were prepared to have opacifying layers having increased levels of carbon black of 0.011 weight %, and 0.021 weight % of opacifying colorant in the matrix polymer in addition to the porous particles that contained no incorporated colorant of any type. These articles exhibited a decreased transparency depth compared to the article of Comparative Example 2 while providing higher $L^*_\infty$, demonstrating that the addition of porous particles with the opacifying colorant, regardless of the first colorant location in the opacifying layer, produced the synergistic effect of lowering the transparency depth while increasing the lightness value according to the present invention. The articles exhibited good light blocking using the flashlight test.

The articles of Invention Example 7 were prepared to have an opacifying layer like the articles of Invention Examples 5 and 6 except that the carbon black was replaced as an opacifying colorant with the combination of the three colorants CYM at levels estimated to give the same covering power and radiation absorption as the nominal carbon black levels in Invention Examples 5 and 6. The articles exhibited $L^*00$ and transparency depth values comparable to those observed in the articles of Invention Example 6. The articles also exhibited good light blocking using the flashlight test.

The articles of Invention Example 8 were prepared to have an opacifying layer like the articles of Invention Example 1 except that the coating formulation contained two kinds of porous particles: the first set of porous particles contained 0.05 weight % of carbon black in the pores and the second set of porous particles was free of colorant. The combination was such that the formulation contained the same amount of carbon black as the articles of Invention Example 1. The articles exhibited very similar performance to those of Invention Example 1 for $L^*\infty$ and transparency depth. The articles also exhibited good light blocking using the flashlight test.

The articles of Invention Example 9 were prepared to have an opacifying layer like that of the articles of Invention Example 8 except that the first set of porous particles contained 0.03 weight % of carbon black in the pores in addition to 0.003 weight % of PB 15:3 as a tinting colorant in the matrix binder, and the second set of porous particles contained only 0.05 weight % of PB 15:3 as a tinting colorant in the pores. The articles exhibited much higher $L^*_\infty$ compared to that observed in the articles of Invention Example 4. This was achieved by lowing level of the tinting colorant. The light blue colored articles exhibited good light blocking in the flashlight test.

The articles of Invention Example 10 were prepared to have an opacifying layer like that of the articles of Invention Example 1 except that the opacifying layer formulation had porous particles containing two sets of pores: the first set of pores contained carbon black in the pores, and the second set of pores was free of colorant. The opacifying layer formulation contained the same amount of carbon black as that used in Invention Example 1. The articles exhibited $L^*\infty$ and transparency depth values comparable to those observed in the article of Invention Example 1. The articles exhibited good light blocking in the flashlight test.

The invention has been described in detail with particular reference to certain preferred embodiments thereof, but it will be understood that variations and modifications can be effected within the spirit and scope of the invention.

The invention claimed is:

1. An article comprising a dry opacifying layer that comprises:
    (a) porous particles comprising a continuous polymeric binder and pores within the continuous polymeric binder, the porous particles having a glass transition temperature of at least 25° C., a porosity of at least 10% and up to and including 70%, and a mode particle size of at least 3 μm and up to and including 40 μm, the porous particles being present in an amount of at least 40 weight % based on the total dry weight of the dry opacifying layer,
    (b) an opacifying colorant that absorbs predetermined electromagnetic radiation within at least 380 nm and up to and including 780 nm, the opacifying colorant being a neutral or black pigment that is present in an amount of at least 0.001 weight % and up to and including 0.3 weight %, based on the total dry weight of the dry opacifying layer, wherein the opacifying colorant is present in the dry opacifying layer within the pores of the porous particles or within the continuous polymeric binder of the porous particles, or within both the pores and continuous polymeric binder of the porous particles, and
(c) a matrix polymer in which the porous particles and opacifying colorant are dispersed, the matrix polymer being water-soluble or water-dispersible and having a glass transition temperature that is less than 25° C., and is present in an amount of at least 10 weight % and up to and including 60 weight %, based on the total weight of the dry opacifying layer, wherein the weight ratio of the matrix polymer to the opacifying colorant in the dry opacifying layer is from 33.3:1 to 60,000:1, and the dry opacifying layer has an interstitial void volume of at least 5 volume % and less than 30 volume %;

provided that:

the article is capable of blocking at least 85% of the predetermined electromagnetic radiation compared to a control article from which the porous particles have been omitted, and the article has a CIELAB L* greater than 70.

2. The article of claim 1 wherein at least 95 weight % and up to and including 100 weight % of the total opacifying colorant is within the porous particles.

3. The article of claim 1, further comprising a substrate on which the opacifying layer is disposed.

4. The article of claim 3, further comprising an underlying layer that has a glass transition temperature below 25° C. and that is disposed between the substrate and the dry opacifying layer.

5. The article of claim 1, wherein the opacifying colorant is a carbon black.

6. The article of claim 1, wherein the opacifying colorant comprises a combination of two or more component pigment colorants.

7. The article of claim 1, wherein the dry opacifying layer is disposed on a substrate that comprises a textile web, polymer, cellulosic material, glass, or ceramic.

8. The article of claim 1, wherein the opacifying colorant is present in the dry opacifying layer in an amount of at least 0.003 weight % and up to and including 0.1 weight % based on the total dry weight of the dry opacifying layer.

9. The article of claim 1, wherein the porous particles comprise a plurality of discrete pores having an average pore size of at least 100 nm and up to and including 4,000 nm.

10. The article of claim 1, wherein the dry opacifying layer has an average dry thickness of at least 50 μm.

11. The article of claim 1, selected from one of the following embodiments:

the opacifying colorant is present in either or both of the pores and continuous polymeric binder of the porous particles, and the article further comprises a second set of porous particles that contain no colorants; and the opacifying colorant is present in either or both of the pores and continuous polymeric binder of the porous particles, wherein the porous particles further comprise a second set of discrete pores that contain no colorants.

* * * * *